United States Patent [19]
Wilson

[11] 3,951,294
[45] Apr. 20, 1976

[54] CONTAINER FOR COMPOST DECOMPOSITION

[76] Inventor: Clifford Arthur Wilson, 58 Oakwood Ave., Purley, Surrey, C.R. 2 1AQ, England

[22] Filed: Nov. 22, 1974

[21] Appl. No.: 526,177

Related U.S. Application Data

[63] Continuation-in-part of Ser. No. 505,278, Sept. 12, 1974, abandoned.

[52] U.S. Cl. .................................. 220/5 R; 220/76; 52/245
[51] Int. Cl.² ........................................... B65D 7/02
[58] Field of Search ............ 220/5 R, 5 A, 4 R, 4 A, 220/4 C, 4 F, 75, 76, 77, 78, 83, 5; 4/172, 172.19; 52/245; 61/60, 61

[56] References Cited
UNITED STATES PATENTS

| | | | |
|---|---|---|---|
| 1,175,168 | 3/1916 | Moulton | 61/60 |
| 2,388,297 | 11/1945 | Slaughter | 52/594 X |
| 2,861,277 | 11/1958 | Hermann | 150/.5 X |
| 3,291,437 | 12/1966 | Bowden et al. | 220/5 R X |

*Primary Examiner*—William Price
*Assistant Examiner*—Steven M. Pollard
*Attorney, Agent, or Firm*—Allegretti, Newitt, Witcoff & McAndrews

[57] ABSTRACT

The invention relates to compost bins in completed or in kit form. A plurality of similar panels are interconnected to form a wall in which one or more panels may be raised to afford access to the interior of the bin. The sides of each panel comprise complementary forked cross-sections which engage to provide a draught resistant seal. Preferred embodiments provide a space between the crotches of the forked cross-sections for the insertion of a securing stud.

9 Claims, 14 Drawing Figures

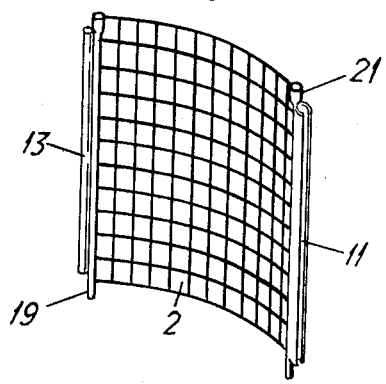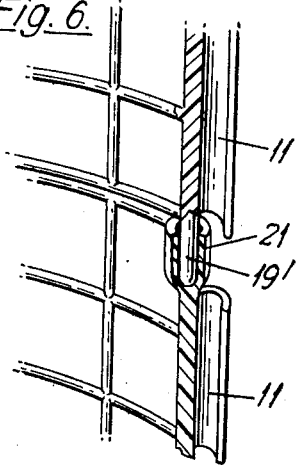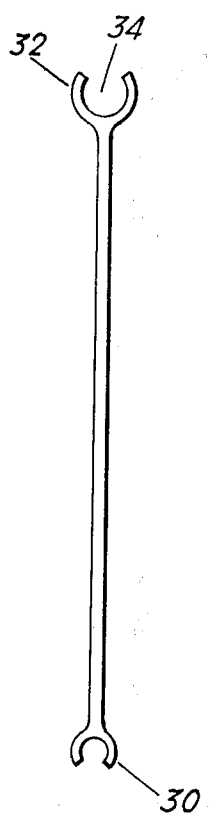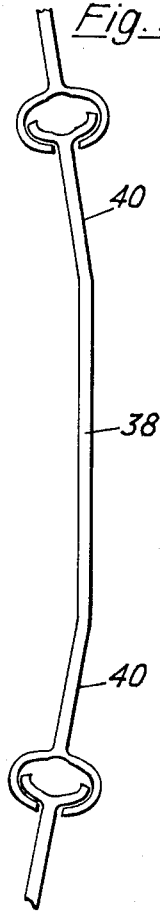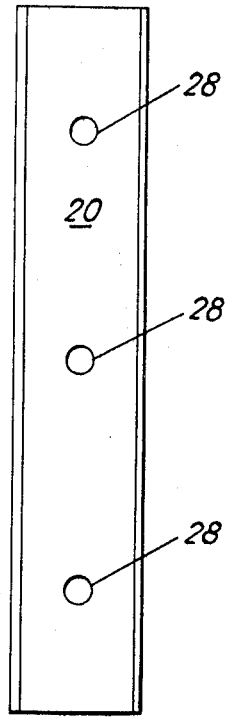

CONTAINER FOR COMPOST DECOMPOSITION

BACKGROUND AND SUMMARY OF THE INVENTION

This application is a continuation-in-part application of my co-pending application Ser. No. 505,278 filed Sept. 12, 1974, now abandoned.

This invention relates to container walls. In particular, it relates to containers to which access may be effected at chosen peripheral locations. In a specific application containers according to the invention are especially suitable as compost bins.

The decomposition of discarded vegetable produce, commonly known as compost normally takes place in two stages. One container is usually used though a second can help to keep a continual flow of compost and space for refuse. The first stage is heat generating when ventilation is required by aerobic creatures. The later stage also requires ventilation to prevent putrification. Decomposition takes place which is generally exothermic, the heat generated thereby accelerating the decomposing process. When the decomposition is complete or at any chosen time, the matter is removed from the container and may be used for any of a number of purposes.

Together with the need for ventilation a good compost bin requires to be made from a heat retaining material i.e. wood or plastics. PVC has good thermal insulating properties and is often preferred. A wire compost bin is not efficient.

Many types of containers may be used in the above described process. However, for a number of reasons it is often preferred to remove matter from the container at or adjacent the lowest point. For example, in domestic applications it is usual to discard compost periodically into a ventilated enclosure and subsequently a plurality of layers are formed, each layer or part of a layer being at a different stage of decomposition. The present invention aims to provide for each sequential transference of decomposed compost out of a container of the kind described.

To this end a compost bin according to the invention comprises a plurality of similar panels, each of which panels is provided with a first side consisting of a straight bead and a second side, parallel to said first side and consisting of a straight concave slot dimensioned to accommodate the bead of said first side such that the bead of one panel may slide in the slot of an adjacent panel, a plurality of said panels being connected at said first and second sides to form at least a part of the wall of the bin, one panel being movable in relation to adjacent panels by movement of said straight bead in the slot of an adjacent panel and by movement of said straight slot enclosing the bead of another adjacent panel for access to the bin interior.

There is also provided a compost bin according to the invention in kit form comprising a plurality of panels, each of said panels being provided with a first side comprising a straight beaded edge and a second side comprising a straight concave slot parallel to said first side, the outer dimensions of said beaded edge corresponding to the inner dimensions of said slot whereby said plurality of panels may be interconnected to form a compost bin having a continuous wall, any one panel in said wall being movable with respect to the other panels to afford access to the interior of said compost bin. The panels could be ventilated; for example, they might be made from a net-like structure which is preferably either inherently rigid or held in a rigid frame. Alternatively, they might be made from an imperforate sheet material. A certain amount of ventilation is desirable and the symmetric location of apertures is preferred. Many available materials are suitable for either use. The inert characteristics of plastics materials make their use eminently suitable.

Access to the compost bin of the invention may be had by sliding one panel relative to adjacent panels to provide an aperture in a part of the container wall. The cross-sections of the bead and slot are preferably substantially the same. The cross-sections can be substantially circular if adjacent panels are to be pivotable about their common connection, but the relative orientation may be fixed by using a polygonal section. A hexagonal section is preferred as, in conjunction with the elastic properties of plastics material, adjacent panels may be forced into a particular resilient orientation without dismantling the connection.

To simplify the manufacturing of a container according to the invention each panel may be made identical, the number of panels to a container determining the resultant size therof. The slot-like construction of the preferred embodiment means that the size of the container may be altered very easily without replacing any part of the unit.

Containers used in the preferred application of the invention are not normally provided with bases or lids but are fixed or at least supported directly on the ground. By the provision of sliding connections between adjacent panels the container may easily rest stably on uneven ground. On a steep slope, for example, wall portions of different heights may be used.

Lids may be provided connected to at least one of the panels. While flexible lids are most convenient, such as a sheet of plastic, a substantially rigid lid may be hinged along the upper edge of one panel. Other types of connection are contemplated such as a two-part lid hinged at the join, each end of the hinge being supported on the periphery, or a lid attached to the periphery with a closable opening therein.

Normally a container according to the invention would comprise panels only connected on two sides thereof. However, the height of each panel may be easily increased by supporting other wall-portions on those of the base container. Simple ball and socket mechanisms could be provided in the top and bottom of each panel to allow for this. Thus the height of a container may be varied along the periphery thereof if desired as well as a whole by using panels having a variety of heights in one construction, some being on top of each other if desired. By using a plurality of panels at different circumferential areas access may be provided at different heights.

The panels would normally be planar or multi-planar but they may be curved or even corrugated if desired. In this way extra strength may be imparted to the structure. Other known types of reinforcement may also be used.

BRIEF DESCRIPTION OF THE DRAWINGS

The invention will now be further described by way of example and with reference to the accompanying drawings wherein:

FIG. 5 shows a curved panel for use in the container of the present invention;

FIG. 6 shows a manner in which a panel like that of FIG. 5 may support another directly above it;

FIG. 9 shows a cross-section of a panel according to another embodiment of the invention;

FIG. 10 shows a front view of a panel suitable for use in the container of FIGS. 7 and 8;

FIG. 11 shows a cross-section of yet another embodiment of the invention including the connections to adjacent panels;

DETAILED DESCRIPTION OF THE PREFERRED EMBODIMENTS

Figure 1:
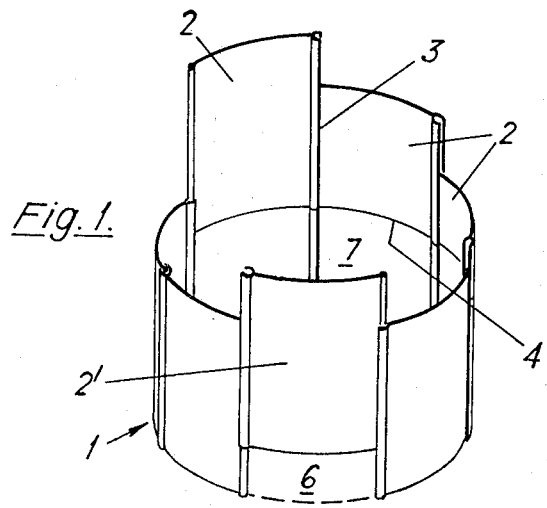
FIG. 1 is a perspective view of an open-ended container constructed in accordance with the invention.

FIG. 1 shows a generally circular open-ended container 1 comprising a plurality of panels 2 with adjacent vertical edges meeting at connections 3 and adjacent horizontal edges meeting at joins 4. Panel 2' is shown displaced from the closed position to provide access through opening 6 to the enclosure 7.

Figure 2:
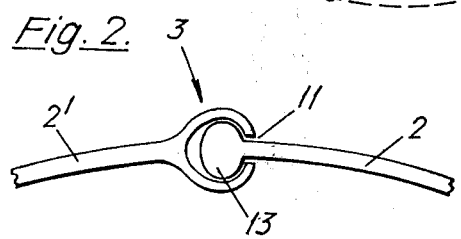
FIGS. 2, 3 and 4 are plan views of connections between adjacent panels according to the invention.

FIG. 2 shows a manner in which a connection between adjacent panels 2, 2' may be effected. Bead 13, formed in panel 2 is shown in convex forked cross-section edge 11 formed in portion 2'. Bead 13 may slide in cross-section 11. This type of join is especially usefull when it is desired to reduce ventilation to a minimum. The dimensions of edge 11 and bead 13 may be varied to permit pivoting of adjacent panels. The cross-sections thereof could be circular or polygonal, though it will be appreciated that exact sections are not critical.

Figure 3:
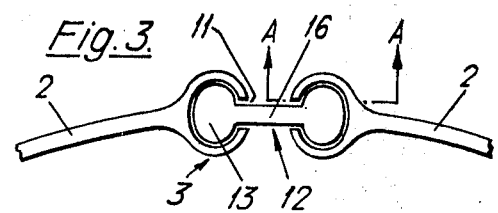

FIG. 3 shows an alternative joining technique. Connecting unit 12 slides in slots 11 formed in each adjacent panel. Unit 12 may have the cross-section of a dumbell having beads 13 formed at two extremities thereof which slide in slots 11. Each bead may be continuous for a length equal to that of the slot, webbing 16 being either continuous or not as desired.

Figure 3A:
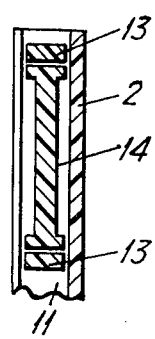
FIG. 3A is a sectional elevation generally on a section A—A as shown in FIG. 3 showing how a plurality of connecting units may be used to join adjacent panels.

In FIG. 3A is shown an embodiment where joining is effected by a plurality of connection units 12. The section drawn shows bead 13 in slot 11 of one panel 2. A spacer 14 is also shown to keep adjacent units apart. This alternative is useful where ventilation is required to a great extent.

Figure 4:
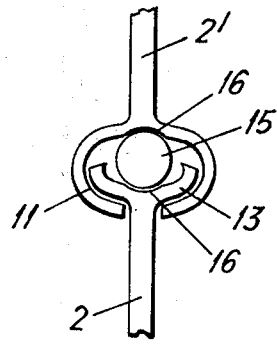
Figure 4A:
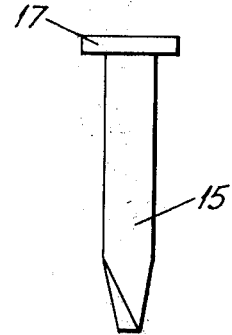
FIG. 4A shows a stud for locking the connection of FIG. 4.

FIG. 4 shows another form of connection according to the invention wherein both bead 13 and edge 11 comprise convex forked cross-sections. When the two parts are engaged as shown, the shaft 15 of a stud (FIG. 4A), slid into the common interior of the forks, ensures a firm fit and that the joint is properly aligned. The head and edge are both provided with recesses 16 at the crotch of the forms to receive the shaft 15. The recesses 16 may be uniform or taper to provide progressive alignment as the stud is inserted. The stud shown in FIG. 4A comprises shaft 15 and head 17, whereby it may be used to secure a cover to the completed container.

The edge sections shown in FIGS. 2, 3 and 4 may be moulded to either a planar, a curvilinear planar, or a multi-planar panel as described herein to satisfy the requirements of a particular application.

FIG. 5 shows a panel 2 formed from a net-like structure in a wire frame 18 having feet 19 at the two lower corners thereof and sockets 20 at the upper corners. Slot 11 and beading 13 are formed integrally on opposite sides of the panel. FIG. 6 shows socket 20 supporting a foot 19' of a similar wall portion.

Figure 7:
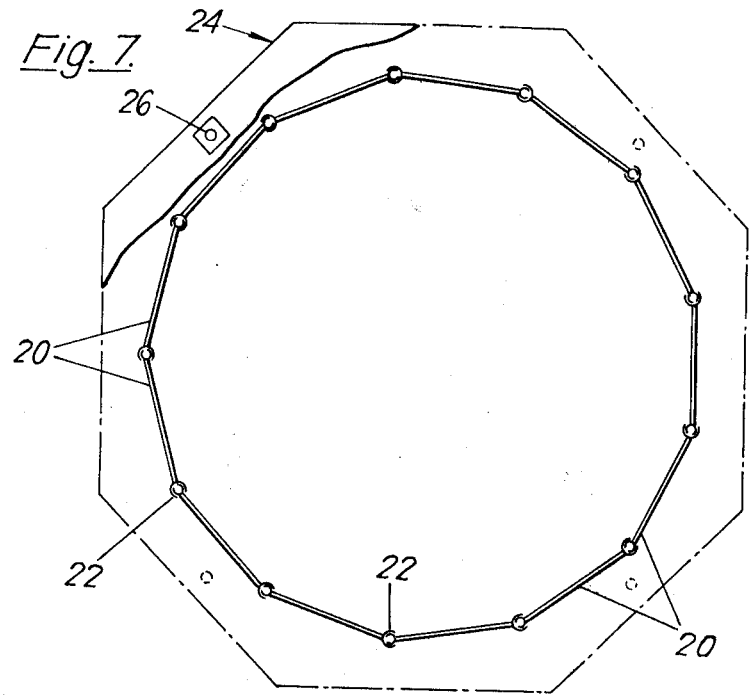
FIG. 7 shows a plan view of another container constructed in accordance with the invention.

FIG. 7 shows a container constructed in accordance with the invention as a polygonal structure. Thirteen panels 20, each about 9 inches wide, are shown joining at 22 in a manner generally as discussed with reference to FIG. 2. A flexible PVC sheet cover 24 is included for covering the top of the bin and having eyelets 26 for tying it either to the ground or to the constituent panels of the bin. Alternatively, cover 24 may be secured to the bin by studs (FIG. 4A) by passing through eyelets in the cover and entering the common interior of the forks as described with reference to FIG. 4. A diameter of approximately 36 inches is contemplated for this structure. Another preferred form of container comprises 18 panels, each about 6 inches wide.

Figure 8:
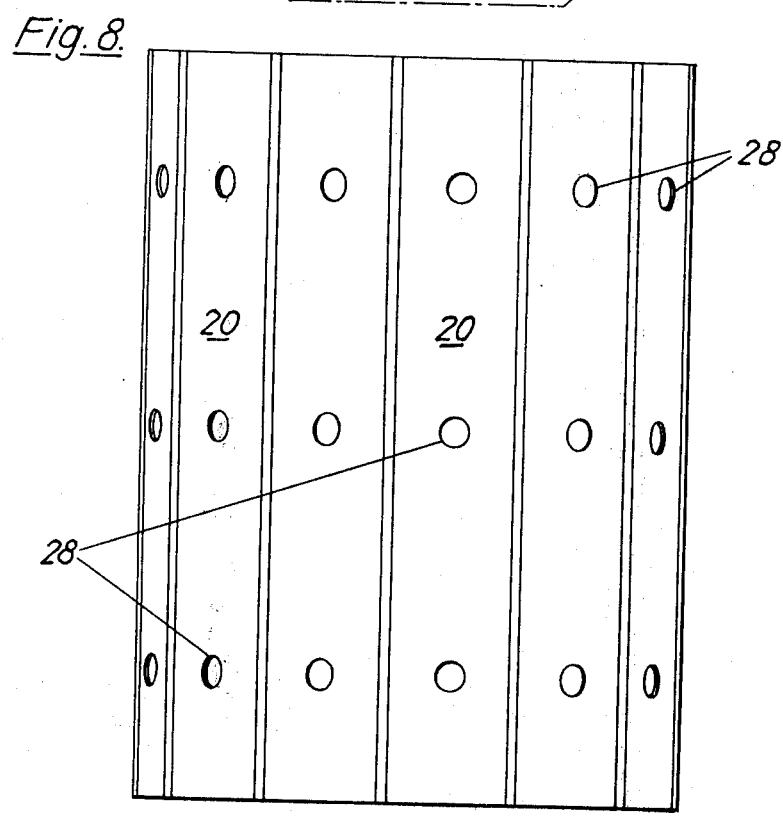
FIG. 8 shows an elevation of the container of FIG. 7.

FIG. 8 shows an elevation of the structure of FIG. 7 and discloses ventilation holes 28 in wall portions 20. Movement of any of the wall-portion 20 in relation to the remaining portions provides access to the interior. The height of a panel could be about 36 inches.

FIG. 9 shows the cross-section of a panel according to one embodiment of the invention which could be used in a structure of the kind shown in FIGS. 7 and 8. Convex forked cross-sections 30 and 32 are shown at opposite sides of the panel. It should be noted that they are of different sizes such that cross-section 30 can slot into the cavity 34 of cross-section 32.

FIG. 10 shows a front view of a panel of the kind described with reference to FIG. 8. The ventilation holes 28 are circular having a diameter of about 1½ inches.

Figure 11A:
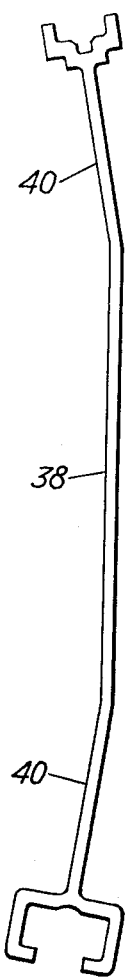
FIG. 11A is a cross-section of still another embodiment of the invention.

The planar panels described with reference to FIGS. 8, 9 and 10 may be modified as shown in FIG. 11. The panel wall 36 comprises three planar portions 38, 40, inclined at an angle of substantially 10° to each other. The centre portion 38 is approximately twice the breadth of the outer portions 40. For example, the center panel might be 3 inches wide and the outer two, 1½ inches, making a total width of just under 6 inches. The connections shown in FIG. 11 are as described with reference to FIG. 4 but it is to be understood that a particular connection is not mandatory to a style of panel although the combination shown in FIG. 11 is most preferred. An alternative form of connection is illustrated in FIG. 11A where the concave slot is of rectangular section and where the beaded edge is so shaped as to complement the internal section of the slot.

The dimensions are not critical but a preferred size for the panel is in the range of 6 to 9 inches wide. The height may be any desired value and the overall plan area merely depends on the size and number of panels used.

In preferred embodiments the panels are made from a plastics material. Polyvinylchloride and polyethelene are eminently suitable.

I claim:

1. A compost bin for the decomposition of discarded vegetable matter therein to compost comprising: a plurality of similar panels, each of which panels is provided with a first side consisting of a straight bead and a second side, parallel to said first side and consisting of a straight concave slot dimensioned to accommodate the bead of said first side such that the bead of one panel may slide in the slot of an adjacent panel; a plurality of said panels being connected at said first and second sides to form at least a part of the wall of the compost bin, one panel being movable in relation to adjacent panels by movement of said straight bead in the slot of an adjacent panel and by movement of said straight slot enclosing the bead of another adjacent panel for access to the compost bin interior for removal of compost therefrom, the compost bin being normally closed at its upper end by a cover which is at least partially removable to provide for delivery of discarded vegetable matter to the interior of the compost bin.

2. A compost bin according to claim 1 wherein cross-sections of said bead and slot are polygonal.

3. A compost bin according to claim 2 wherein the external surface of said bead corresponds to the portion of the internal cross-section of said slot at the extremity thereof.

4. A compost bin according to claim 1 wherein each panel is provided with a plurality of apertures located symmetrically therein.

5. A compost bin for the decomposition of discarded vegetable matter therein to compost comprising: a plurality of similar panels, each of which panels is provided with a first side consisting of a straight bead and a second side, parallel to said first side and consisting of a straight concave slot dimensioned to accomodate the bead of said first side such that the bead of one panel may slide in the slot of an adjacent panel; a plurality of said panels being connected at said first and second sides to form at least a part of the wall of the compost bin, one panel being movable in relation to adjacent panels by movement of said straight bead in the slot of an adjacent panel and by movement of said straight slot enclosing the bead of another adjacent panel for access to the compost bin interior for removal of compost therefrom, each of said beads and slots having a convex forked cross-section; and a stud which is provided for engaging the crotch of each cross-section between engaged panels to secure and align the connection.

6. A compost bin according to claim 5 wherein the cross-sections of said bead and slot are polygonal.

7. A compost bin according to claim 5 including a flexible cover for securement thereto by the studs penetrating apertures in the cover.

8. A kit for creating a compost bin therefrom comprising: a plurality of panels, each of said panels being provided with a first side comprising a straight beaded edge and a second side comprising a straight concave slot parallel to said first side; the outer dimensions of said beaded edge corresponding to the inner dimensions of said slot whereby said plurality of panels may be interconnected to form a compost bin having a continuous wall, any one panel in said wall being movable with respect to the other panels to afford access to the interior of said compost bin; each of said first and second sides having a forked cross-section, a number of studs, corresponding to the number of interconnections between the panels, with a stud being inserted into each of said interconnections to secure the same.

9. A kit for creating a compost bin therefrom comprising: a plurality of panels, each of said panels being provided with a first side comprising a straight beaded edge and a second side comprising a straight concave slot parallel to said first side; the outer dimensions of said beaded edge corresponding to the inner dimensions of said slot whereby said plurality of panels may be interconnected to form a compost bin having a continuous wall, any one panel in said wall being movable with respect to the other panels to afford access to the interior of said compost bin; and a cover for securement to the upper, open end of said compost bin.

* * * * *